US012810639B2

(12) United States Patent
Ishidera

(10) Patent No.: US 12,810,639 B2
(45) Date of Patent: Nov. 24, 2026

(54) AUTHENTICITY DETERMINATION SUPPORT SYSTEM

(71) Applicant: NEC Corporation, Tokyo (JP)

(72) Inventor: Eiki Ishidera, Tokyo (JP)

(73) Assignee: NEC CORPORATION, Tokyo (JP)

( * ) Notice: Subject to any disclaimer, the term of this patent is extended or adjusted under 35 U.S.C. 154(b) by 224 days.

(21) Appl. No.: 18/713,346

(22) PCT Filed: Dec. 10, 2021

(86) PCT No.: PCT/JP2021/045652
§ 371 (c)(1),
(2) Date: May 24, 2024

(87) PCT Pub. No.: WO2023/105789
PCT Pub. Date: Jun. 15, 2023

(65) Prior Publication Data
US 2025/0014368 A1 Jan. 9, 2025

(51) Int. Cl.
*G06V 20/00* (2022.01)
*G06V 10/75* (2022.01)
*G06V 20/62* (2022.01)

(52) U.S. Cl.
CPC ............ *G06V 20/95* (2022.01); *G06V 10/751* (2022.01); *G06V 20/62* (2022.01)

(58) Field of Classification Search
CPC ...... G06V 20/95; G06V 10/751; G06V 20/62; G06Q 50/10
See application file for complete search history.

(56) References Cited

U.S. PATENT DOCUMENTS

| | | | | |
|---|---|---|---|---|
| 9,123,067 | B2 * | 9/2015 | Deyle | G06Q 30/0609 |
| 9,575,724 | B1 * | 2/2017 | Liberatori, Jr. | G06Q 20/023 |
| 10,127,589 | B2 * | 11/2018 | Nair | G06F 18/24 |
| 10,192,299 | B2 * | 1/2019 | Shevchenko | G06V 30/224 |
| 11,568,460 | B2 * | 1/2023 | Bandara | G06Q 30/0643 |

(Continued)

FOREIGN PATENT DOCUMENTS

| | | | |
|---|---|---|---|
| JP | 2003-150488 | A | 5/2003 |
| JP | 2006-011866 | A | 1/2006 |
| JP | 2020-086573 | A | 6/2020 |

OTHER PUBLICATIONS

International Search Report for PCT Application No. PCT/JP2021/045652, mailed on Mar. 15, 2022.

*Primary Examiner* — Utpal D Shah
(74) *Attorney, Agent, or Firm* — Sughrue Mion, PLLC

(57) ABSTRACT

An authenticity determination support system includes an acquiring means, a checking means, and a presenting means. The acquiring means acquires an image of a determination target object from a user terminal. The checking means checks the image of the determination target object against images in image group information stored in a storing means that stores the image group information including an image of an authentic product and an image of a counterfeit thereof. In a case where the image group information including an image that matches the image of the determination target object is detected as a result of the checking, the presenting means displays support information including the detected image group information on a screen of the user terminal.

15 Claims, 8 Drawing Sheets

(56) References Cited

U.S. PATENT DOCUMENTS

| | | | | |
|---|---|---|---|---|
| 2014/0279613 | A1* | 9/2014 | Lee | G06Q 30/0185 705/318 |
| 2015/0254759 | A1* | 9/2015 | Varadarajan | G06Q 30/0641 705/27.1 |
| 2016/0217157 | A1* | 7/2016 | Shih | G06F 16/5854 |
| 2017/0161810 | A1* | 6/2017 | Nair | G06F 16/5854 |

* cited by examiner

AUTHENTICITY DETERMINATION SUPPORT SYSTEM

This application is a National Stage Entry of PCT/JP2021/045652 filed on Dec. 10, 2021, the contents of all of which are incorporated herein by reference, in their entirety.

TECHNICAL FIELD

The present invention relates to a system, method, and recording medium for supporting determination of authenticity of a determination target object by a user.

BACKGROUND ART

A system that supports determination of authenticity of goods is described in, for example, Patent Literature 1. This authenticity determination support system displays goods information of a determination target object and authentic goods information of the determination target object on a display screen of an appraising user's terminal, and the appraising user determines authenticity of the determination target object based on the content of display on the display screen.

CITATION LIST

Patent Literature

Patent Literature 1: Japanese Unexamined Patent Application Publication No. JP-A 2020-086573

SUMMARY OF INVENTION

Technical Problem

In the case of the abovementioned authenticity determination support system, an appraising user determines authenticity based on the goods information of a determination target object and the authentic goods information of the determination target object. Therefore, a user who determines authenticity is limited to a user with expertise in authenticity determination. Accordingly, it has been difficult for a user without such expertise to determine authenticity of goods.

The present invention is to provide an authenticity determination support system that solves the abovementioned problem, namely, the problem that it is difficult for a user without expertise in authenticity determination to determine authenticity of goods.

Solution to Problem

An authenticity determination support system as an aspect of the present invention is an authenticity determination support system supporting determination of authenticity of a determination target object by a user, the system including:

an acquiring means that acquires an image of a determination target object from a user terminal;

a checking means that checks the image of the determination target object against images in image group information stored in a first storing means, the first storing means storing the image group information including an image of an authentic product and an image of a counterfeit of the product; and a presenting means that displays support information on a screen of the user terminal in a case where the image group information including an image that matches the image of the determination target object is detected as a result of the checking, the support information including the detected image group information.

Further, an authenticity determination support method as another aspect of the present invention is an authenticity determination supporting method for supporting determination of authenticity of a determination target object by a user, the method including:

acquiring an image of a determination target object from a user terminal:

checking the image of the determination target object against images in image group information stored in a first storing means, the first storing means storing the image group information including an image of an authentic product and an image of a counterfeit of the product; and displaying support information on a screen of the user terminal in a case where the image group information including an image that matches the image of the determination target object is detected as a result of the checking, the support information including the detected image group information.

Further, a computer-readable recording medium as another aspect of the present invention is a non-transitory computer-readable recording medium on which a program is recorded, the program including instructions for causing a computer that supports determination of authenticity of a determination target object by a user to execute processes to:

acquire an image of a determination target object from a user terminal;

check the image of the determination target object against images in image group information stored in a first storing means, the first storing means storing the image group information including an image of an authentic product and an image of a counterfeit of the product; and display support information on a screen of the user terminal in a case where the image group information including an image that matches the image of the determination target object is detected as a result of the checking, the support information including the detected image group information.

Advantageous Effects of Invention

With the configurations as described above, the present invention enables even a user without expertise in authenticity determination to easily determine authenticity of goods

DESCRIPTION OF EXAMPLE EMBODIMENTS

First Example Embodiment

Next, a first example embodiment of the present invention will be described in detail with reference to the drawings.

Figure 1:
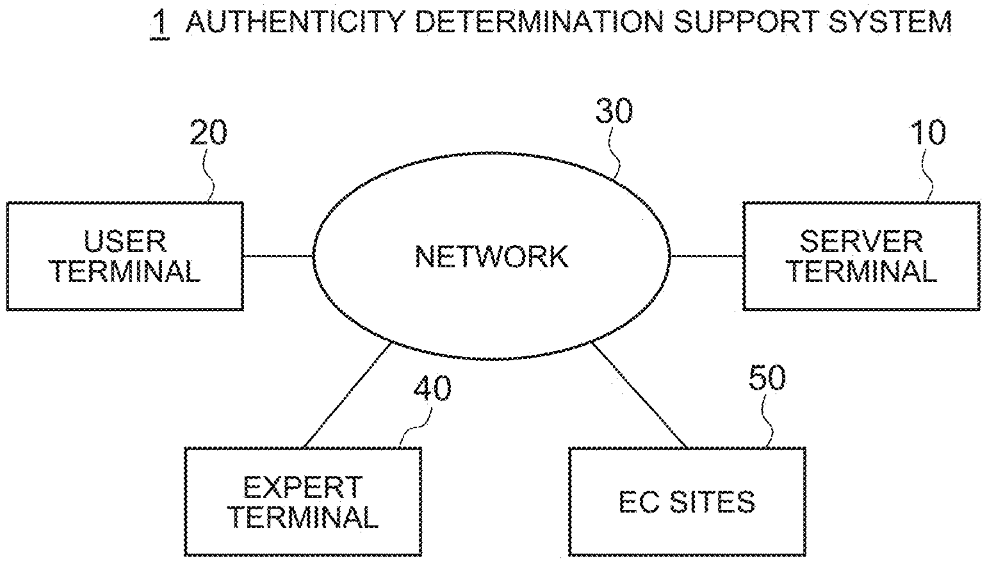
FIG. 1 is a block diagram of an authenticity determination support system according to a first example embodiment of the present invention.

FIG. 1 is a block diagram of an authenticity determination support system 1 according to the first example embodiment of the present invention. This authenticity determination support system 1 is for determining authenticity of pharmaceutical packages subject to transaction independently. For example, pharmaceutical packages include primary packaging such as a container or PTP sheet that comes into direct contact with a pharmaceutical product and an outside container or outside wrapper that further packages the primary packaging for retail sale. However, the present invention may also be for determining authenticity of goods other than pharmaceutical packages, such as bags, wallets, watches, clothes, and banknotes. Hereinafter, a pharmaceutical package may be simply referred to as a package.

Referring to FIG. 1, the authenticity determination support system 1 is configured with a server terminal 10 and a user terminal 20, which are connected so as to be able to communicate with each other via a network 30 such as the Internet. The user terminal 20 is a terminal used by a user who determines authenticity of a package. The user terminal 20 may be an information processing device such as a smartphone, a portable information terminal, or a personal computer that has a camera function, a communication function, and a display function. On the other hand, the server terminal 10 is a terminal that provides the user terminal 20 with information for supporting determination of authenticity of a package in response to a request from the user terminal 20. The server terminal 10 may be an information processing device such as a personal computer that has a communication function, an arithmetic function, and a memory function.

For example, when the user of the using terminal 20 wants to examine whether a package which the user intends to purchase is authentic or inauthentic, the user acquires an image obtained by capturing the appearance of the package using the camera function of the user terminal 20. Next, the user terminal 20 transmits a support request including the acquired image to the server terminal via the network 30. Then, the user terminal 20 waits for a response from the server terminal 10.

The server terminal 10 stores in advance image group information that includes an image of an authentic package and an image of a counterfeit of the package and, preferably, further includes text and/or a figure illustrating a key point for distinguishing between the image of the authentic package and the image of the counterfeit. When receiving a support request from the user terminal 20 via the network 30, the server terminal 10 checks an image of a package included by the support request against images (including both an image of an authentic package and an image of a counterfeit) within image group information stored in advance. Next, in a case where image group information including an image (including at least one of an image of an authentic package and an image of a counterfeit) that matches the image of the package included by the support request is detected as a result of the checking, the server terminal 10 transmits the detected image group information as support information to the user terminal 20.

When the support information including the image group information is transmitted from the server terminal 10, the user terminal 20 receives and displays the support information on the screen. Consequently, the user can see not only the image of the authentic package but also the image of the counterfeit on the package of an authenticity determination target. Therefore, compared with a case where the user must determine whether a package of an authenticity determination target is authentic or inauthentic based solely on an image of an authentic package, the user can determine the similarity between an image of a package of an authenticity determination target and images of authentic and inauthentic packages from a more multifaceted perspective, and can perform authenticity determination more easily and more accurately. Furthermore, since text and/or a figure illustrating a key point for distinguishing between an image of an authentic package and an image of a counterfeit is displayed, the user can perform authenticity determination even more easily and more accurately.

Further, in the authenticity determination support system 1 shown in FIG. 1, an expert terminal 40 and EC (Electronic Commerce) sites 50 are connected to the network 30. The expert terminal 40 is a terminal used by an expert who determines authenticity of a package. The expert terminal 40 may be an information processing device such as a smartphone, a portable information terminal, or a personal computer that has a camera function, a communication function, and a display function. Moreover, the EC sites 50 are sites where packages are sold. The EC sites 50 each publish an image of a package to be sold in association with a product name. The roles of the expert terminal 40 and the EC sites 50 will be described later.

Subsequently, the configuration and operation of the server terminal 10 will be described in detail.

Figure 2:
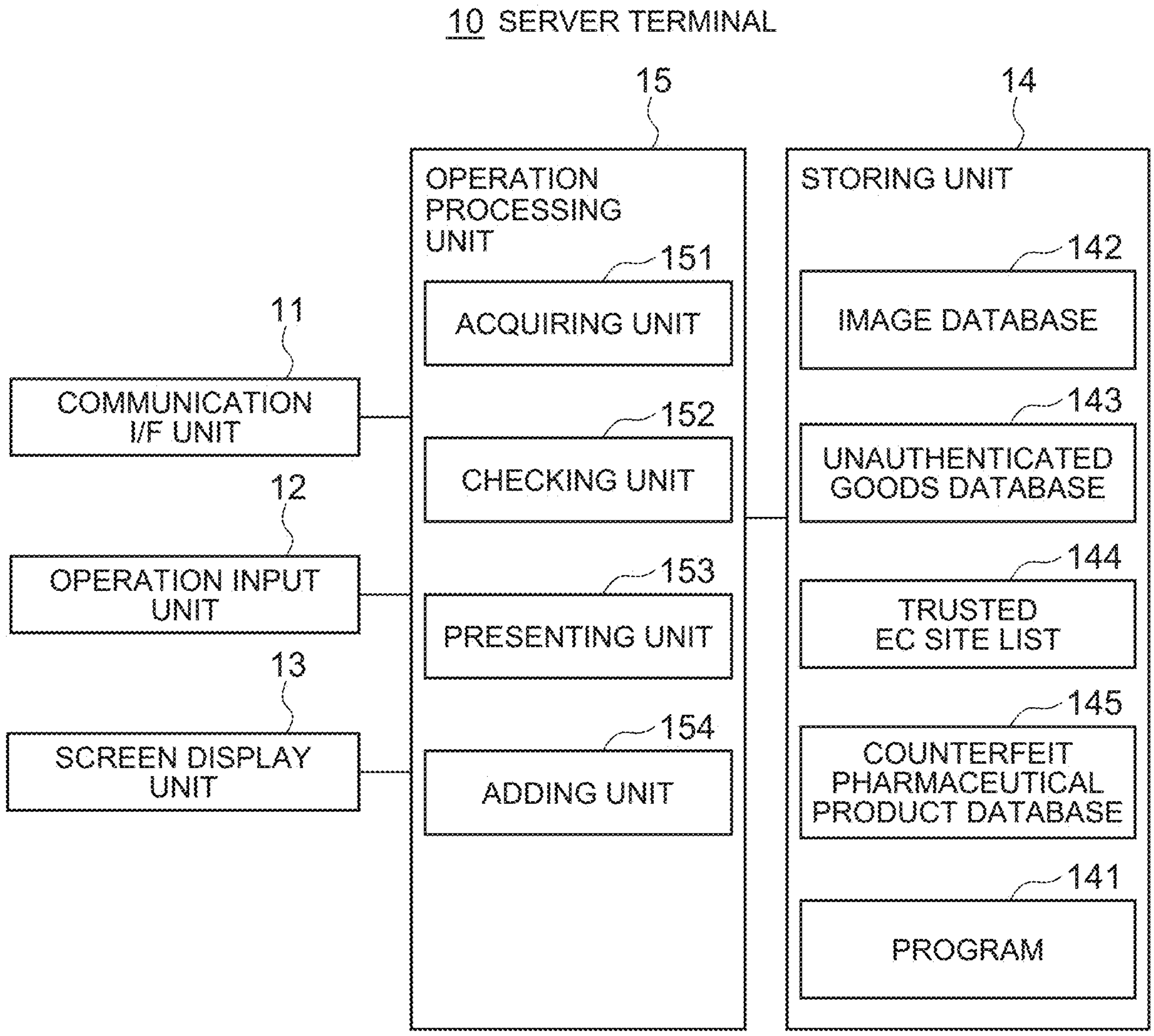
FIG. 2 is a block diagram showing an example of a server terminal in the first example embodiment of the present invention.

FIG. 2 is a block diagram showing an example of the server terminal 10. Referring to FIG. 2, the server terminal 10 includes a communication I/F unit 11, an operation input unit 12, a screen display unit 13, a storing unit 14, and an operation processing unit 15.

The communication I/F unit 11 is configured with a data communication circuit, and performs data communication with external devices such as the user terminal 20, the expert terminal 40, and the EC sites 50 via the network 30 by radio or by wire. The operation input unit 12 is configured with a device such as a keyboard or a mouse, and detects an operator's operation and outputs to the operation processing unit 15. The screen display unit 13 is configured with a device such as an LCD (Liquid Crystal Display), and displays a variety of information on a screen in response to an instruction from the operation processing unit 15.

The storing unit 14 is configured with one or a plurality of storage devices such as a hard disk and a memory, and stores processing information and a program 141 that are necessary for a variety of processing in the operation processing unit 15. The program 141 is a program loaded and executed by the operation processing unit 15 to realize various processing units, and is loaded in advance from an external device or a recording medium, which is not shown, via a data input/output function such as the communication I/F unit 11 and stored into the storing unit 14. Main processing information stored in the storing unit 14 includes an image database 142, an unauthenticated goods database 143, a trusted EC site list 144, and a counterfeit pharmaceutical product database 145.

Figure 3:
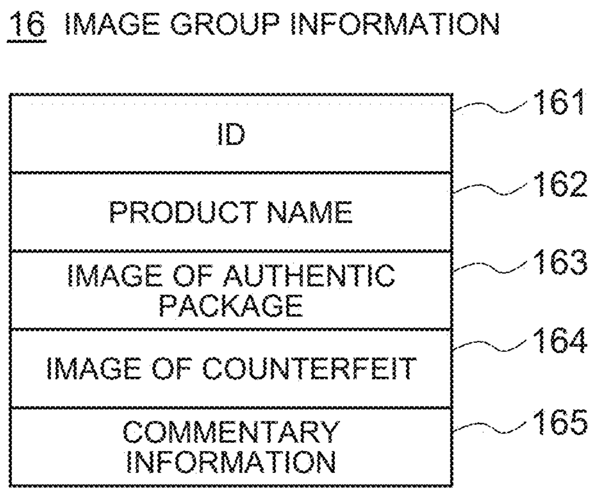
FIG. 3 is a view showing an example of image group information stored in an image database in the first example embodiment of the present invention.

The image database 142 stores, for each package, image group information for supporting a user who determines authenticity of a package. In the example of FIG. 2, the image database 142 is locally connected to the server terminal 10, but may be remotely connected to the server terminal 10. FIG. 3 shows an example of image group information 16 stored in the image database 142. In the example shown in FIG. 3, the image group information 16 includes an ID 161, a product name 162, an image 163 obtained by capturing an authentic package, an image 164 obtained by capturing a counterfeit, and commentary information 165.

In the item of the ID 161, a number or the like that uniquely identifies the image group information 16 is recorded. In the item of the product name 162, the product name of a pharmaceutical product is recorded. In the item of the image 163 of authentic package, an image obtained by capturing an authentic package sold with the product name 162 is recorded. In the item of the image 164 of counterfeit, an image obtained by capturing a counterfeit package of a pharmaceutical product sold with the product name 162 is recorded. In the item of the commentary information 165, text and/or a figure illustrating a key point for distinguishing between the image 163 of authentic package and the image 164 of counterfeit is recorded. In the example shown in FIG. 2, the image 163 of authentic package and the image 164 of counterfeit are each a single image, but may each include two or more images.

Referring to FIG. 2 again, the unauthenticated goods database 143 temporarily stores an image of an unauthenticated package. In the example of FIG. 2, the unauthenticated goods database 143 is locally connected to the server terminal 10, but may be remotely connected. In a case where it is confirmed by an expert that an image stored in the unauthenticated goods database 143 is an image of an authentic package or an image of a counterfeit package, new image group information 16 including the image is registered into the image database 142, and the original image is deleted from the unauthenticated goods database 143.

In the trusted EC site list 144, a list of sites which are confirmed as trustworthy in a prior survey among the EC sites 50 selling packages is recorded. The EC sites on the list publish images of packages sold therein in association with product names. Therefore, when an image search on the Internet is performed with the product name of a pharmaceutical product as a keyword, an image of an authentic package provided by the site. The images of authentic packages provided by these sites may include images that match or do not match the image of authentic package registered in image database 142.

The counterfeit pharmaceutical product database 145 stores in advance an image of a counterfeit package. In the example of FIG. 2, the counterfeit pharmaceutical product database 145 is locally connected to the server terminal 10, but may be remotely connected. The images of counterfeit packages stored in the counterfeit pharmaceutical product database 145 may include images that match or do not match the image of counterfeit package registered in the image database 142.

The operation processing unit 15 has one or a plurality of processors such as an MPU and a peripheral circuit thereof and, by loading the program 141 from the storing unit 14 and executing, causes the abovementioned hardware and the program 141 to cooperate with each other and realizes various processing units. Major processing units realized by the operation processing unit include an acquiring unit 151, a checking unit 152, a presenting unit 153, and an adding unit 154.

The acquiring unit 151 is configured to communicate with the user terminal 20 via the network 30 through the communication I/F unit 11 and acquire a support request including an image of an authentication determination target package (hereinafter, referred to as a determination target image) from the user terminal 20.

The checking unit 152 is configured to check the determination target image included by the support request received from the acquiring unit 151 against the images 163 obtained by capturing authentic packages and the images 164 obtained by capturing counterfeits in all the image group information 16 stored in the image database 142. In checking images, for example, a subject identification engine may be used. The checking unit 152 detects the image group information 16 in which at least one of the image 163 of authentic package and the image 164 of counterfeit matches the determination target image. The checking unit 152 transmits the result of checking that includes the ID 161 of the detected image group information 16 to the presenting unit 153. Moreover, in a case where the image group information 16 as described above is not detected at all, the checking unit 152 transmits the result of checking that does not include the ID 161 of the image group information at all to the presenting unit 153. Furthermore, the checking unit 152 assigns an unauthenticated goods ID to the determination target image for which the image group information 16 is not detected at all and stores into the unauthenticated goods database 143.

The presenting unit 153 is configured to present information that supports determination of authenticity of a determination target object to the user of the user terminal 20. The presenting unit 153 examines whether or not the ID 161 is included by the checking result transmitted from the checking unit 152 and, when included, creates support information based on the image database 142 and, when not included, creates support information based on the EC sites 50 and the counterfeit pharmaceutical product database 145.

In the creation of support information based on the image database 142, using the ID 161 included by the checking result as a key, the presenting unit 153 reads out the image group information 16 having the ID 161 from the image database 142, and creates support information based on this image group information 16 having been read out. For example, the presenting unit 153 uses the image group information 16 without change as the support information.

In the creation of support information based on the EC sites, the presenting unit 153 first extracts a product name from the determination target image. Next, the presenting unit 153 performs image search on the Internet using the extracted product name as a keyword. As a result of this image search, images obtained by capturing an authentic package sold with the extracted product name can be obtained. Next, the presenting unit 153 extracts only images provided by the EC sites on the trusted EC site list 144 from among the images of package obtained by the image search.

Next, the presenting unit 153 checks the extracted images against the determination target image and detects an image obtained by capturing an authentic package that matches the determination target image. Next, the presenting unit 153 creates support information including the detected image as an example of the image of authentic package. In a case where the image of authentic package that matches the determination target image cannot be detected at all, the presenting unit 153 creates support information showing the fact.

In the creation of support information based on the counterfeit pharmaceutical product database 145, the presenting unit 153 first checks the images of counterfeit package stored in the counterfeit pharmaceutical product database 145 against the determination target image, and thereby detects the image of counterfeit package that matches the determination target image. Next, the presenting unit 153 creates support information including the detected image as an example of the image of counterfeit package. In a case where the image of the counterfeit package matching the determination target image cannot be detected at all, the presenting unit 153 creates support information indicating the fact.

The presenting unit 153 transmits the support information created in the above manner to the user terminal 20 requesting support through the communication I/F unit 11 via the network 30, and causes the user terminal 20 to display the support information on the screen. Various modes can be considered that the presenting unit 153 causes the user terminal 20 to display the support information on the screen. For example, the presenting unit 153 may cause to simultaneously display the image of authentic package, the image of counterfeit, and the commentary information that are included by the support information. Alternatively, the presenting unit 153 may cause to alternately display the image of authentic package and the image of counterfeit included by the support information and, only when display of the commentary information is requested by the user, display the commentary information.

The adding unit 154 is configured to enrich the image database 142 by collecting image group information relating to unauthenticated determination target images from experts and storing into the image database 142. For example, when a determination target image to which an unauthenticated goods ID is assigned is newly stored into the unauthenticated goods database 143 by the checking unit 152, the adding unit 154 transmits unauthenticated goods information to the expert terminal 40. The adding unit 154 includes, in the unauthenticated goods information, at least a determination target image with the unauthenticated goods ID assigned. The adding unit 154 may also include, in the unauthenticated goods information, information on an image of an authentic package that matches the determination target image. The adding unit 154 acquires an image of an authentic package that matches the determination target image from the EC sites 50, for example, in the following manner.

The adding unit 154 first extracts the product name of a pharmaceutical product from a determination target image with an unauthenticated goods ID assigned. Next, the adding unit 154 performs image search on the Internet with the extracted product name as a keyword. As a result of this image search, images obtained by capturing an authentic package sold with the extracted product name are obtained. Next, the adding unit 154 extracts only images provided by the EC sites on the trusted EC site list 144 from among the images of package obtained by the image search. Next, the adding unit 154 checks the extracted images against the determination target image and detects an image of the authentic product that matches the determination target image.

Further, in a case where new image group information is transmitted from the expert terminal 40, the adding unit 154 receives it and stores into the image database 142. Here, the format of the image group information transmitted from the expert terminal 40 is the same as that of the image group information 16 shown in FIG. 3. However, the unauthenticated goods ID is set in the ID 161 by the expert.

That is to say, the expert uses his/her expertise to determine whether the determination target image received from the server terminal 10 is an image obtained by capturing an authentic package or an image obtained by capturing a counterfeit package. Moreover, in a case where the unauthenticated goods information received from the server terminal 10 includes information on an image of an authentic package that matches the determination target image, the expert can determine with reference to the information.

For example, in the case of determining that the determination target image is an image obtained by capturing an authentic package, the expert creates the image group information 16 that the unauthenticated goods ID is recorded in the item of the ID 161, the product name of the authentic package is recorded in the item of the product name 162, the determination target image or, instead thereof, another image obtained by capturing the authentic package is recorded in the item of the image 163 of authentic package, and NULL is set in the items of the image 164 of counterfeit and the commentary information 165. However, in a case where the expert has acquired an image of a counterfeit of the authentic package through some route, the expert may set the image of the counterfeit in the item of the image 164 and record text and/or a figure illustrating a key point for distinguishing between the image 163 of authentic package and the image 164 of counterfeit in the item of the commentary information 165. Moreover, in the of determining that the determination target image is an image of a counterfeit package, the expert records the unauthenticated goods ID in the item of the ID 161, records the product name of the authentic package and the image of the package that are the basis for the determination that the package is a counterfeit in the items of the product name 162 and the image 163 of authentic package, records the determination target image in the item of the image 164 of counterfeit, and records text and/or a figure illustrating a key point for distinguishing between the image 163 of authentic package and the image 164 of counterfeit in the item of the commentary information 165, and thereby creates the image group information 16.

Next, the expert transmits the image group information 16 created in the above manner from the expert terminal 40 to the server terminal 10 via the network 30. When receiving this image group information 16 through the communication I/F unit 11, the adding unit 154 rewrites the item of the ID 161 to an ID that can uniquely identify in the image database 142, and registers into the image database 142. Next, the adding unit 154 deletes the determination target image having the unauthenticated goods ID before the rewriting from the unauthenticated goods database 143.

Subsequently, the operation of the server terminal 10 will be described.

Figure 4:
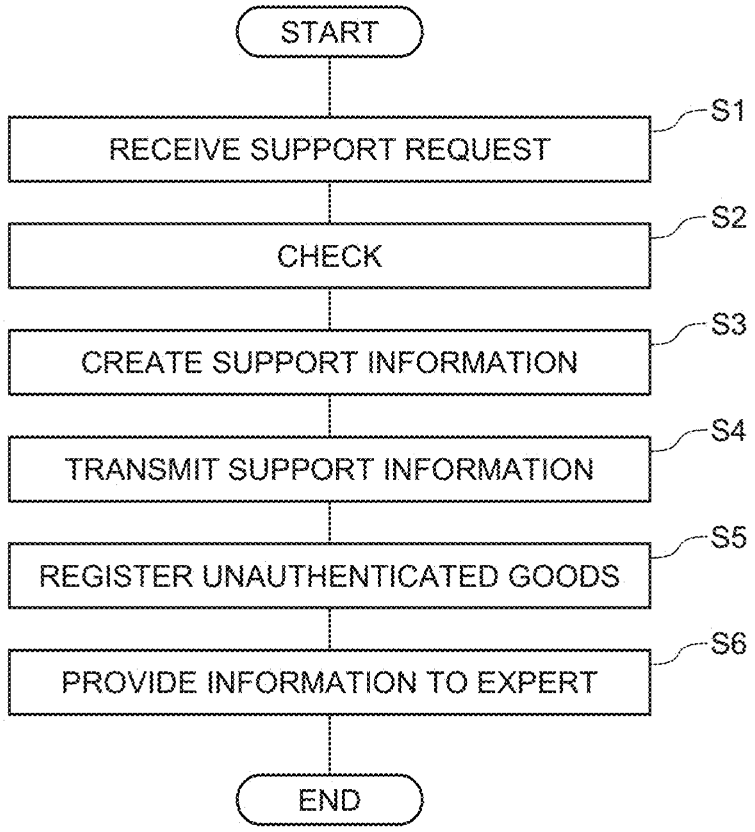
FIG. 4 is a flowchart showing an example of the operation of the server terminal when a support request is transmitted from a user terminal in the first example embodiment of the present invention.

FIG. 4 is a flowchart showing an example of the operation of the server terminal 10 when a support request is transmitted from the user terminal 20 to the server terminal 10. Referring to FIG. 4, the acquiring unit 151 of the server terminal 10 receives a support request transmitted from the user terminal 20 (step S1). Next, the checking unit 152 of the server terminal 10 checks a determination target image included by the support request against the images 163 of authentic package and the images 164 of counterfeit in all the image group information 16 stored in the image database 142 (step S2). At step S2, in a case where the image group information 16 that at least one of the image 163 of authentic package and the image 164 of counterfeit matches the determination target image is detected, the checking unit 152 transmits a checking result that includes the ID 161 of the detected image group information 16 to the presenting unit 153. Moreover, at step S2, in a case where the image group information 16 as described above is not detected at all, the checking unit 152 transmits a checking result that does not include the ID 161 of the image group information 16 at all to the presenting unit 153.

Next, the presenting unit 153 creates information that supports determination of authenticity of the determination target object (step S3). At step S3, the presenting unit 153 examines whether or not the ID 161 is included by the checking result and, when included, creates support information by the method as described before based on the image database 142 and, when not included, creates support information by the method as described before based on the EC sites 50 and the counterfeit pharmaceutical product database 50. Next, the presenting unit 153 transmits the created support information to the user terminal 20 requesting support through the communication I/F unit 11 via the network 30, and causes the user terminal 20 to display the support information on the screen (step S4).

Further, the checking unit 152 assigns an unauthenticated goods ID to the determination target information for which the image group information 16 is not detected at all in the checking at step S2 and stores into the unauthenticated goods database 143 (step S5). Moreover, when the new determination target image is stored in the unauthenticated goods database 143, the adding unit 154 transmits unauthenticated goods information including the determination target image with the unauthenticated goods ID assigned to the expert terminal 40 (step S6).

Figure 5:
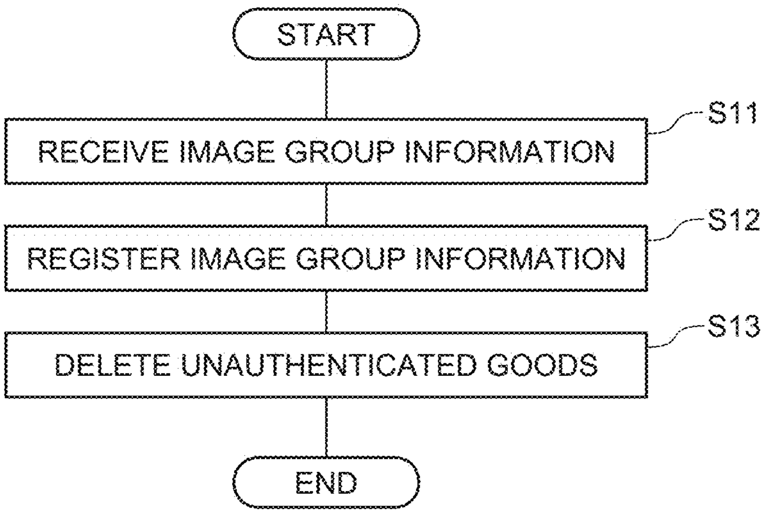
FIG. 5 is a flowchart showing an example of the operation of the server terminal when image group information is transmitted from an expert terminal in the first example embodiment of the present invention.

FIG. 5 is a flowchart showing an example of the operation of the server terminal 10 when the image group information is transmitted to the server terminal 10 from the expert terminal 40. Referring to FIG. 5, the adding unit 154 of the server terminal 10 receives the image group information 16 transmitted from the expert terminal 40 (step S11). Next, the adding unit 154 rewrites the ID 161 of the received image group information from the unauthenticated goods ID to the ID of the image group information, and registers in the image database 142 (step S12). Next, the adding unit 154 deletes the determination target image having the unauthenticated goods ID before the rewriting from the unauthenticated goods database 143 (step S13).

Subsequently, a specific example of the support information displayed on the screen of the user terminal 20 will be described.

Figure 6:
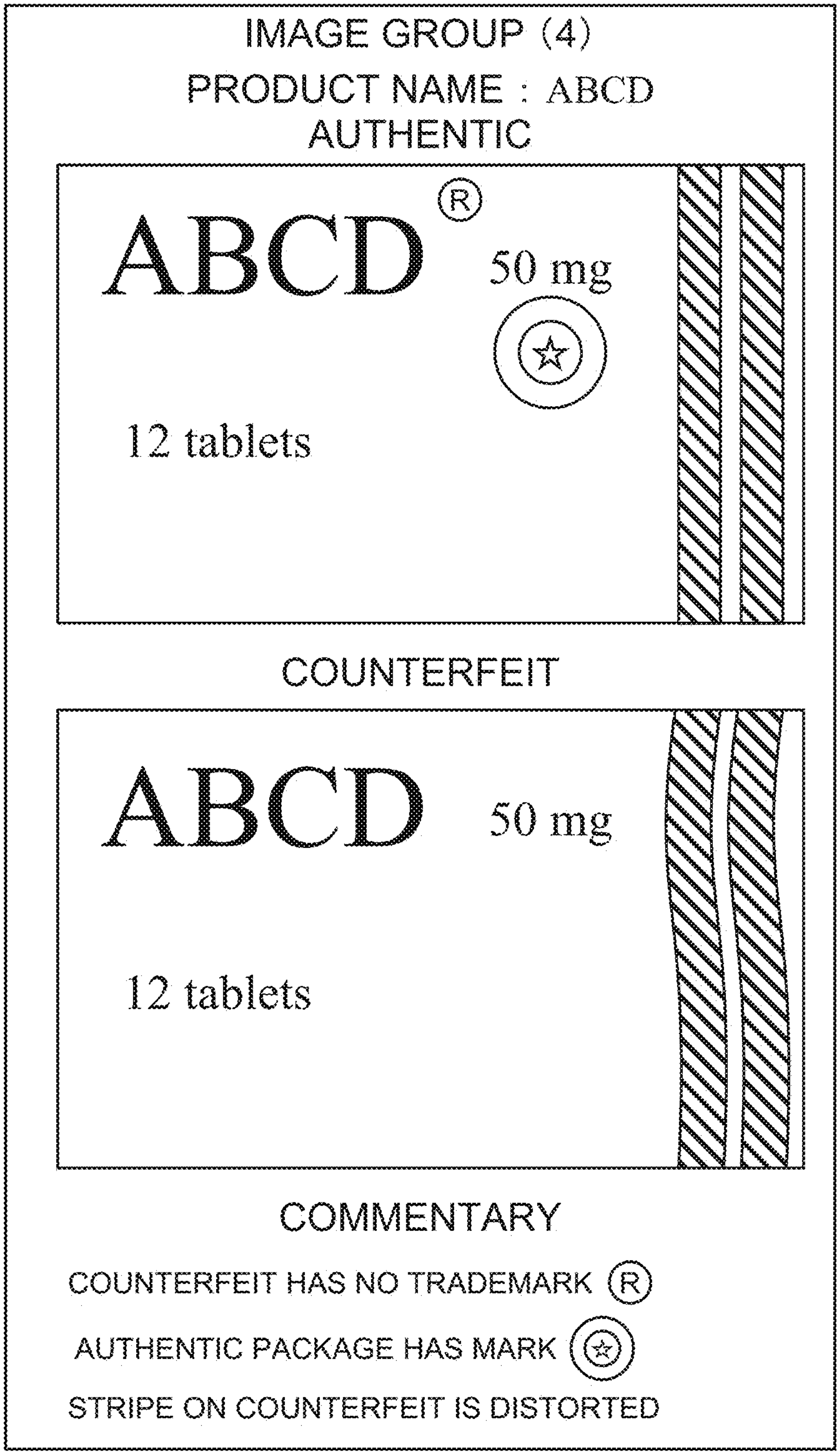
FIG. 6 is a schematic view showing an example of support information displayed on a screen of the user terminal in the first example embodiment of the present invention.

FIG. 6 is a schematic view showing an example of the support information displayed on the screen of the user terminal 20. The support information in this example shows an image obtained by capturing an authentic package (an outside package in this example) and an image obtained by capturing a counterfeit vertically in line, and further shows text that illustrates a key point for distinguishing between the authentic package and the counterfeit. In this example, it is described in the commentary information that the counterfeit does not have a trademark, that the authentic package has a mark as shown in the view but the counterfeit does not, and that a stripe pattern on the counterfeit is distorted. Since the support information is thus presented that includes not only the image of the authentic package but also the image of the counterfeit package and text and an image illustrating a key point for distinguishing between the authentic package and the counterfeit, the user can determine authenticity of packages from a more multifaceted perspective, and can perform the authenticity determination easily and accurately.

Figure 7:
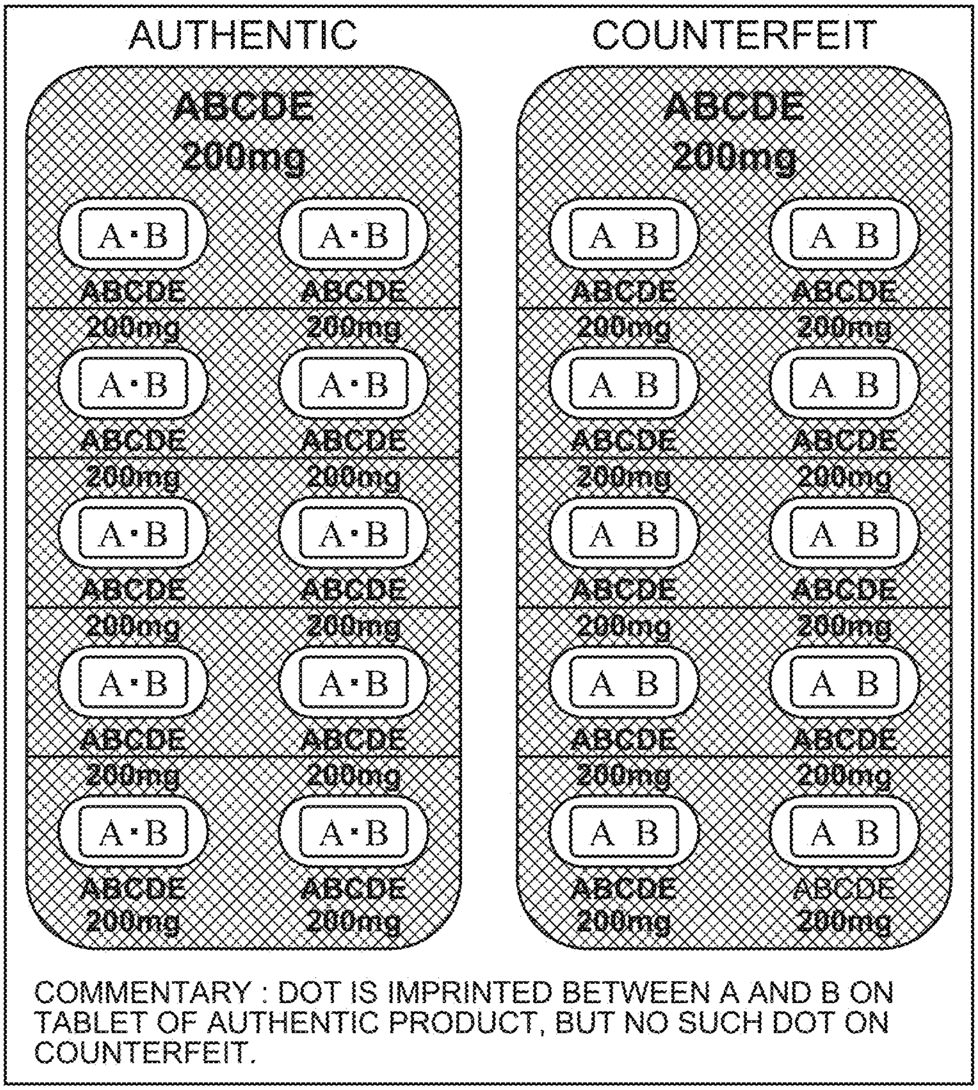
FIG. 7 is a schematic view showing another example of the support information displayed on the screen of the user terminal in the first example embodiment of the present invention.

FIG. 7 is a schematic view showing another example of the support information displayed on the screen of the user terminal 20. The support information in this example shows an image obtained by capturing an authentic package (a PTP sheet in this example) and an image obtained by capturing a counterfeit horizontally in line, and further shows text that illustrates a key point for distinguishing between the authentic package and the counterfeit. In this example, there is no difference between the authentic package and the counterfeit in terms of package shape and printed content. However, letters imprinted on tablets contained in the pockets of the PTP sheet are different between the authentic package and the counterfeit. That is to say, a dot is imprinted between letters A and B on the authentic product, whereas such a dot is not imprinted on the counterfeit. Since the support information is thus presented that includes not only the image of the authentic package but also the image of the counterfeit package and text and an image illustrating a key point for distinguishing between the authentic product and the counterfeit, the user can determine authenticity of packages from a multifaceted perspective, and can perform the authenticity determination easily and accurately.

Thus, the server terminal 10 checks a determination target image included by a support request transmitted from the user terminal 20 against the image 163 of authentic package and the image 164 of counterfeit in all the image group information 16 stored in the image database 142. Next, in a case where the image group information 16 that at least one of the image 163 of authentic package and the image 164 of counterfeit matches the determination target image is detected, the server terminal 10 creates support information that includes an image of an authentic package, an image of a counterfeit, and text and/or an image illustrating a key point for distinguishing between the above images, based on the detected image group information 16, and causes the user terminal 20 to display on the screen. Consequently, the user can execute authenticity determination easily and accurately.

Further, in a case where the image group information 16 that matches the determination target image is not detected, the server terminal 10 creates support information based on the result of searching an image that matches the determination target image from the trusted EC sites 50 and the counterfeit pharmaceutical product database 145, and causes the user terminal 20 to display on the screen. Consequently, the user can perform authenticity determination with accuracy at a certain degree.

Further, in a case where the image group information 16 that matches the determination target image is not detected, the server terminal 10 stores the determination target image into the unauthenticated goods database 143, and also transmits the determination target image to the expert terminal 40. Then, when the expert performs authenticity determination on the determination target image and transmits image group information created based on the result from the expert terminal 40, the server terminal 10 receives it and adds and registers into the image database 142. Consequently, it is possible to enrich the image database.

Second Example Embodiment

Next, a second example embodiment of the present invention will be described with reference to the drawings.

Figure 8:
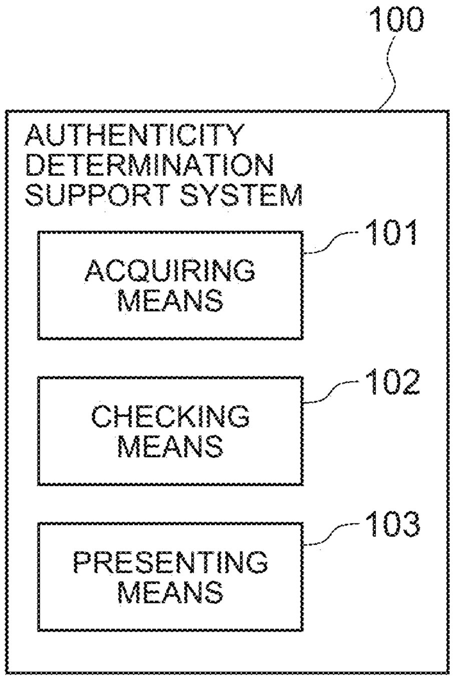
FIG. 8 is a block diagram of an authenticity determination support system according to a second example embodiment of the present invention.

FIG. 8 is a block diagram of an authenticity determination support system 100 according to the second example embodiment of the present invention. This authenticity determination support system 100 is a system that supports determination of authenticity of a determination target object by a user. Referring to FIG. 8, the authenticity determination support system 100 includes an acquiring means 101, a checking means 102, and a presenting means 103.

The acquiring means 101 is configured to acquire an image obtained by capturing a determination target object from a user terminal. The acquiring means 101 can be configured, for example, in the same manner as the acquiring unit 151 of FIG. 2, but is not limited thereto.

The checking means 102 is configured to check images in image group information stored in a storing means that stores the image group information including an image obtained by capturing an authentic product and an image obtained by capturing a counterfeit of the product against the image obtained by capturing the determination target object. The checking means 102 can be configured, for example, in the same manner as the checking unit 152 of FIG. 2, but is not limited thereto.

The presenting means 103 is configured to, in a case where image group information including an image that matches the image obtained by capturing the determination target object is detected as a result of checking by the checking means 102, causes the user terminal to display support information including the detected image group information on a screen.

The authenticity determination support system 100 thus configured operates in the following manner. That is to say, first, the acquiring means 101 acquires an image obtained by capturing a determination target object from a user terminal. Next, the checking means 102 checks images in image group information stored in a storing means that stores the image group information including an image obtained by capturing an authentic product and an image obtained by capturing a counterfeit of the product against the image of the determination target object. Next, in a case where image group information including an image that matches the image of the determination target object is detected as a result of checking by the checking means 102, the presenting means 103 causes the user terminal to display support information including the detected image group information on a screen.

According to the authenticity determination support system 100 that is configured and operates as described above, even a user without expertise in authenticity determination can easily determine authenticity of goods. The reason is that the authenticity determination support system 100 includes the acquiring means 101, the checking means 102, and the presenting means 103 that are configured and operate as described above.

Although the present invention has been described above with reference to the example embodiments, the present invention is not limited to the example embodiments described above. The configurations and details of the present invention can be changed in various manners that can be understood by one skilled in the art within the scope of the present invention.

INDUSTRIAL APPLICABILITY

The present invention can be utilized in a field of determining authenticity of pharmaceutical packages and other goods such as bags, wallets, watches, clothes, and banknotes The whole or part of the example embodiments disclosed above can be described as, but not limited to, the following supplementary notes.

[Supplementary Note 1]

An authenticity determination support system supporting determination of authenticity of a determination target object by a user, the system comprising:

an acquiring means that acquires an image of a determination target object from a user terminal;

a checking means that checks the image of the determination target object against images in image group information stored in a first storing means, the first storing means storing the image group information including an image of an authentic product and an image of a counterfeit of the product; and a presenting means that displays support information on a screen of the user terminal in a case where the image group information including an image that matches the image of the determination target object is detected as a result of the checking, the support information including the detected image group information.

[Supplementary Note 2]

The authenticity determination support system according to Supplementary Note 1, wherein the image group information further includes text and/or a figure illustrating a key point for distinguishing between the image of the authentic product and the image of the counterfeit of the product.

[Supplementary Note 3]

The authenticity determination support system according to Supplementary Note 1 or 2, wherein the checking means stores the image of the determination target object into a second storing means that stores an image of an unauthenticated product in a case where the image group information including an image that matches the image of the determination target object is not detected as a result of the checking.

[Supplementary Note 4]

The authenticity determination support system according to Supplementary Note 3, further comprising an adding means that adds new image group information into the first storing means in a case where the image of the unauthenticated product stored in the second storing means is identified by an expert as an image of an authentic product, the new image group information including the image identified by the expert as the image of the authentic product.

[Supplementary Note 5]

The authenticity determination support system according to Supplementary Note 3 or 4, further comprising an adding means that adds new image group information into the first storing means in a case where the image of the unauthenticated product stored in the second storing means is identified by an expert as an image of a counterfeit product, the new image group information including an image of an authentic product based on which the expert has determined to be the counterfeit product, the image identified by the expert as the image of the counterfeit product, and text and/or a figure illustrating a key point for distinguishing between the image of the authentic product and the image of the counterfeit product.

[Supplementary Note 6]

The authenticity determination support system according to Supplementary Note 4 or 5, wherein the adding means extracts a product name from the image of the unauthenticated product stored in the second storing means, checks the image of the unauthenticated product against images of authentic products provided by a trusted site extracted by image search on Internet with the extracted product name as a keyword, and transmits information to an expert terminal registered in advance, the information including the image of the authentic product provided by the trusted site that matches the image of the unauthenticated product and the image of the unauthenticated product.

[Supplementary Note 7]

The authenticity determination support system according to any of Supplementary Notes 1 to 6, wherein in a case where the image group information including an image that matches the image of the determination target object is not detected as a result of the checking, the presenting means extracts a product name from the image of the determination target object, checks the image of the determination target object against images of authentic products provided by a trusted site extracted by image search on Internet with the extracted product name as a keyword, and displays support information on the screen of the user terminal, the support information including the image of the authentic product provided by the trusted site that matches the image of the determination target object.

[Supplementary Note 8]

The authenticity determination support system according to any of Supplementary Notes 1 to 7, wherein in a case where the image group information including an image that matches the image of the determination target object is not detected as a result of the checking, the presenting means checks the image of the determination target object against images of counterfeit products recorded in a counterfeit database storing the images of the counterfeit products, and displays support information on the screen of the user terminal, the support information including the image of the counterfeit product that matches the image of the determination target object.

[Supplementary Note 9]

An authenticity determination supporting method for supporting determination of authenticity of a determination target object by a user, the method comprising:

acquiring an image of a determination target object from a user terminal;

checking the image of the determination target object against images in image group information stored in a first storing means, the first storing means storing the image group information including an image of an authentic product and an image of a counterfeit of the product; and displaying support information on a screen of the user terminal in a case where the image group information including an image that matches the image of the determination target object is detected as a result of the checking, the support information including the detected image group information.

[Supplementary Note 10]

The authenticity determination supporting method according to Supplementary Note 9, wherein the image group information further includes text and/or a figure illustrating a key point for distinguishing between the image of the authentic product and the image of the counterfeit of the product.

[Supplementary Note 11]

The authenticity determination supporting method according to Supplementary Note 9 or 10, comprising in the checking, storing the image of the determination target object into a second storing means that stores an image of an unauthenticated product in a case where the image group information including an image that matches the image of the determination target object is not detected as a result of the checking.

[Supplementary Note 12]

The authenticity determination supporting method according to Supplementary Note 11, further comprising adding new image group information into the first storing means in a case where the image of the unauthenticated product stored in the second storing means is identified by an expert as an image of an authentic product, the new image group information including the image identified by the expert as the image of the authentic product.

[Supplementary Note 13]

The authenticity determination supporting method according to Supplementary Note 11 or 12, further comprising adding new image group information into the first storing means in a case where the image of the unauthenticated product stored in the second storing means is identified by an expert as an image of a counterfeit product, the new image group information including an image of an authentic product based on which the expert has determined to be the counterfeit product, the image identified by the expert as the image of the counterfeit product, and text and/or a figure illustrating a key point for distinguishing between the image of the authentic product and the image of the counterfeit product.

[Supplementary Note 14]

The authenticity determination supporting method according to Supplementary Note 12 or 13, comprising in the adding, extracting a product name from the image of the unauthenticated product stored in the second storing means, checking the image of the unauthenticated product against images of authentic products provided by a trusted site extracted by image search on Internet with the extracted product name as a keyword, and transmitting information to an expert terminal registered in advance, the information including the image of the authentic product provided by the trusted site that matches the image of the unauthenticated product and the image of the unauthenticated product.

[Supplementary Note 15]

The authenticity determination supporting method according to any of Supplementary Notes 9 to 14, comprising in the displaying, in a case where the image group information including an image that matches the image of the determination target object is not detected as a result of the checking, extracting a product name from the image of the determination target object, checking the image of the determination target object against images of authentic products provided by a trusted site extracted by image search on Internet with the extracted product name as a keyword, and displaying support information on the screen of the user terminal, the support information including the image of the authentic product provided by the trusted site that matches the image of the determination target object.

[Supplementary Note 16]

The authenticity determination supporting method according to any of Supplementary Notes 9 to 15, comprising in the displaying, in a case where the image group information including an image that matches the image of the determination target object is not detected as a result of the checking, checking the image of the determination target object against images of counterfeit products recorded in a counterfeit database storing the images of the counterfeit products, and displaying support information on the screen of the user terminal, the support information including the image of the counterfeit product that matches the image of the determination target object.

[Supplementary Note 17]

A non-transitory computer-readable recording medium on which a program is recorded, the program comprising instructions for causing a computer that supports determination of authenticity of a determination target object by a user to execute processes to:

acquire an image of a determination target object from a user terminal;

check the image of the determination target object against images in image group information stored in a first storing means, the first storing means storing the image group information including an image of an authentic product and an image of a counterfeit of the product; and display support information on a screen of the user terminal in a case where the image group information including an image that matches the image of the determination target object is detected as a result of the checking, the support information including the detected image group information.

REFERENCE SIGNS LIST

1 authenticity determination support system
10 server terminal
11 communication I/F unit
12 operation input unit
13 screen display unit
14 storing unit
15 operation processing unit
16 image group information
20 user terminal
30 network
40 expert terminal
50 EC sites
141 program
142 image database
143 unauthenticated goods database
144 trusted EC site list
145 counterfeit pharmaceutical product database
151 acquiring unit
152 checking unit
153 presenting unit
154 adding unit
161 ID
162 product name
163 image obtained by capturing authentic product
164 image obtained by capturing counterfeit
165 commentary information

What is claimed is:

1. An authenticity determination support system supporting determination of authenticity of a determination target object by a user, the system comprising:

a memory containing program instructions; and a processor coupled to the memory, wherein the processor is configured to execute the program instructions to:

acquire an image of a determination target object from a user terminal;

check the image of the determination target object against images in image group information stored in a first database, the first database storing the image group information including an image of an authentic product and an image of a counterfeit of the product;

display first support information on a screen of the user terminal in a case where the image group information including an image that matches the image of the determination target object is detected as a result of the checking, the first support information including the detected image group information; and display second support information on the screen of the user terminal in a case where the image group information including an image that matches the image of the determination target object is not detected as a result of the checking, in the displaying the second support information, extract a product name from the image of the determination target object and check the image of the determination target object against images of authentic products provided by a trusted site extracted by image search on Internet with the extracted product name as a keyword, the second support information including the image of the authentic product provided by the trusted site that matches the image of the determination target object.

2. The authenticity determination support system according to claim 1, wherein the image group information further includes text and/or a figure illustrating a key point for distinguishing between the image of the authentic product and the image of the counterfeit of the product.

3. The authenticity determination support system according to claim 1, wherein the processor is further configured to execute the instructions to, in the checking, store the image of the determination target object into a second database that stores an image of an unauthenticated product in the case where the image group information including an image that matches the image of the determination target object is not detected as a result of the checking.

4. The authenticity determination support system according to claim 3, wherein the processor is further configured to execute the instructions to add new image group information into the first database in a case where the image of the unauthenticated product stored in the second database is identified by an expert as an image of an authentic product, the new image group information including the image identified by the expert as the image of the authentic product.

5. The authenticity determination support system according to claim 3, wherein the processor is further configured to execute the instructions to add new image group information into the first database in a case where the image of the unauthenticated product stored in the second database is identified by an expert as an image of a counterfeit product, the new image group information including an image of an authentic product based on which the expert has determined to be the counterfeit product, the image identified by the expert as the image of the counterfeit product, and text and/or a figure illustrating a key point for distinguishing between the image of the authentic product and the image of the counterfeit product.

6. The authenticity determination support system according to claim 4, wherein the processor is further configured to execute the instructions to:

extract a product name from the image of the unauthenticated product stored in the second database;

check the image of the unauthenticated product against images of authentic products provided by a trusted site extracted by image search on Internet with the extracted product name as a keyword; and transmit information to an expert terminal registered in advance, the information including the image of the authentic product provided by the trusted site that matches the image of the unauthenticated product and the image of the unauthenticated product.

7. The authenticity determination support system according to claim 1, wherein the processor is further configured to execute the instructions to, in the displaying the second support information, check the image of the determination target object against images of counterfeit products recorded in a counterfeit database storing the images of the counterfeit product, the support information further including the image of the counterfeit product that matches the image of the determination target object.

8. An authenticity determination supporting method for supporting determination of authenticity of a determination target object by a user, the method comprising:

acquiring an image of a determination target object from a user terminal;

checking the image of the determination target object against images in image group information stored in a first database, the first database storing the image group information including an image of an authentic product and an image of a counterfeit of the product;

displaying first support information on a screen of the user terminal in a case where the image group information including an image that matches the image of the determination target object is detected as a result of the checking, the first support information including the detected image group information; and displaying second support information on the screen of the user terminal in a case where the image group information including an image that matches the image of the determination target object is not detected as a result of the checking, in the displaying the second support information, extracting a product name from the image of the determination target object and checking the image of the determination target object against images of authentic products provided by a trusted site extracted by image search on Internet with the extracted product name as a keyword, the second support information including the image of the authentic product provided by the trusted site that matches the image of the determination target object.

9. The authenticity determination supporting method according to claim 8, wherein the image group information further includes text and/or a figure illustrating a key point for distinguishing between the image of the authentic product and the image of the counterfeit of the product.

10. The authenticity determination supporting method according to claim 9, comprising in the checking, storing the image of the determination target object into a second database that stores an image of an unauthenticated product in the case where the image group information including an image that matches the image of the determination target object is not detected as a result of the checking.

11. The authenticity determination supporting method according to claim 10, further comprising adding new image group information into the first database in a case where the image of the unauthenticated product stored in the second database is identified by an expert as an image of an authentic product, the new image group information including the image identified by the expert as the image of the authentic product.

12. The authenticity determination supporting method according to claim 11, further comprising adding new image group information into the first database in a case where the image of the unauthenticated product stored in the second database is identified by an expert as an image of a counterfeit product, the new image group information including an image of an authentic product based on which the expert has determined to be the counterfeit product, the image identified by the expert as the image of the counterfeit product, and text and/or a figure illustrating a key point for distinguishing between the image of the authentic product and the image of the counterfeit product.

13. The authenticity determination supporting method according to claim 11, comprising, in the adding:

extracting a product name from the image of the unauthenticated product stored in the second database, checking the image of the unauthenticated product against images of authentic products provided by a trusted site extracted by image search on Internet with the extracted product name as a keyword; and transmitting information to an expert terminal registered in advance, the information including the image of the authentic product provided by the trusted site that matches the image of the unauthenticated product and the image of the unauthenticated product.

14. The authenticity determination supporting method according to claim 8, comprising, in the displaying the second support information, checking the image of the determination target object against images of counterfeit products recorded in a counterfeit database storing the images of the counterfeit product, the second support information further including the image of the counterfeit product that matches the image of the determination target object.

15. A non-transitory computer-readable recording medium on which a program is recorded, the program comprising instructions for causing a computer that supports determination of authenticity of a determination target object by a user to execute processes to:

acquire an image of a determination target object from a user terminal;

check the image of the determination target object against images in image group information stored in a first database, the first database storing the image group information including an image of an authentic product and an image of a counterfeit of the product;

display first support information on a screen of the user terminal in a case where the image group information including an image that matches the image of the determination target object is detected as a result of the checking, the first support information including the detected image group information; and display second support information on the screen of the user terminal in a case where the image group information including an image that matches the image of the determination target object is not detected as a result of the checking, in the displaying the second support information, extract a product name from the image of the determination target object and check the image of the determination target object against images of authentic products provided by a trusted site extracted by image search on Internet with the extracted product name as a keyword, the second support information including the image of the authentic product provided by the trusted site that matches the image of the determination target object.

* * * * *